(12) United States Patent
Jody et al.

(10) Patent No.: US 7,410,110 B2
(45) Date of Patent: Aug. 12, 2008

(54) EFFICIENT PROCESS FOR MAKING TACKIFIERS AND ADHESIVES

(75) Inventors: Bassam J. Jody, Tinley Park, IL (US); Edward J. Daniels, Orland Park, IL (US)

(73) Assignee: UChicago Argonne, LLC, Chicago, IL (US)

( * ) Notice: Subject to any disclaimer, the term of this patent is extended or adjusted under 35 U.S.C. 154(b) by 162 days.

(21) Appl. No.: 11/393,603

(22) Filed: Mar. 30, 2006

(65) Prior Publication Data

US 2007/0045454 A1 Mar. 1, 2007

Related U.S. Application Data

(60) Provisional application No. 60/712,506, filed on Aug. 30, 2005.

(51) Int. Cl.
*B02C 19/00* (2006.01)
(52) U.S. Cl. ............................................. 241/5; 241/23
(58) Field of Classification Search ................ 241/23, 241/30, 5, 275; 526/89, 242, 250
See application file for complete search history.

(56) References Cited

U.S. PATENT DOCUMENTS

| 3,973,733 | A | | 8/1976 | Switzer |
| 4,233,388 | A | * | 11/1980 | Bergen et al. .......... 430/137.18 |
| 4,313,737 | A | | 2/1982 | Massey et al. |
| 7,176,265 | B2 | * | 2/2007 | Morgan ....................... 526/89 |

OTHER PUBLICATIONS

Liau, I. S., and M.A. McHugh, "High Pressure Solid Polymer-Supercritical Fluid Phase Behavior", Supercritical Fluid Technology, Process Technology Proceedings, 3, Edited by J.M.L. Penninger, M. Radosz, M.A. McHugh and V.J. Krukonis, Published by Elsevier, 1985.

* cited by examiner

*Primary Examiner*—Mark Rosenbaum
(74) *Attorney, Agent, or Firm*—Joan Pennington

(57) ABSTRACT

An improved process for preparing tackifiers and adhesives is an improved energy efficient process for preparing tackifiers, adhesives and dispersions of low-molecular weight polymers and other materials in water. Fine grinding of a low molecular weight polymer is performed to provide the low molecular weight polymer reduced to a selected average particle size in a range between approximately 2.5 μm and approximately 7.5 μm with a maximum particle size of less than 10 μm.

6 Claims, 2 Drawing Sheets

EFFICIENT PROCESS FOR MAKING TACKIFIERS AND ADHESIVES

This application claims the benefit of U.S. Provisional Application No. 60/712,506, filed on Aug. 30, 2005.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to an improved process for preparing solid/liquid dispersions such as tackifiers and adhesives. More specifically this invention relates to an improved energy efficient process for preparing tackifiers, adhesives and dispersions of low-molecular weight polymers and other materials in water.

DESCRIPTION OF THE RELATED ART

Tackifiers, which generally consist of low molecular weight polymers, are a component in the manufacture of many types of adhesives. Water based tackifiers are prepared by stirring a low-molecular-weight polymer water mixture maintained slightly below 100° C. for a period of time sufficient to form a polymer-water emulsion. When cooled the emulsion forms a polymer in water dispersion. The excess water is then evaporated when the tackifier is used in making the adhesive.

This conventional method generally takes about 3-5 hours of stirring and about 10,000 Btu of thermal energy and about 0.1 kWh of electric energy to process 1 pound of polymer resin, which makes about 2 pounds of the tackifier emulsion.

The present inventors previously proposed a method of converting the low-molecular weight polymer into a fine powder, which would allow preparation of the water-polymer dispersion requiring less thermal energy and time. The fine powder was to be prepared by treating the low-molecular weight polymers with a sub-critical or super-critical fluid, such as $CO_2$, to a very fine powder of the polymer which, it was expected, and would require much less thermal energy and time to prepare the tackifier emulsions. It was proposed to evaluate carbon dioxide, propane, ethane, Tetrafluoroethane and other fluids at elevated pressures as potential fluids for shattering the low molecular weight polymers into a fine powder. Water at sub-critical conditions was also to be investigated because it is also used as a raw material in making tackifiers dispersions.

The proposed process involved adding the polymers individually or as a mixture to the fluid and enclosing the polymers/fluid mixture in a sealed containment that is equipped with a cover that will suddenly open when the predetermined pressure is reached. The mixture is then heated allowing the fluid to penetrate the polymer structure. When the pressure is suddenly released the fluid that is inside the swelled polymer will suddenly boil and expand resulting in the shattering of the polymer chips into fine particles. The fluid vapor can then be condensed and reused, or if it is water or $CO_2$ it can be simply released.

Polymers are known to absorb fluids and swell at elevated pressures. For example, it has been experimentally shown that in the presence of $CO_2$, Polymethyl Methacrelate (PMMA) absorbed about 12% of its weight in $CO_2$ and swelled by about 11% at 42° C. and 50 bars. As a result of absorbing $CO_2$, it was suggested that the glass transition temperature of PMMA was also reduced from 105° C. to 68° C. Further, shattering of solid hydrocarbon based solids that can absorb fluids under high pressure including supercritical conditions is also well demonstrated.

A principal object of the present invention is to provide an improved process for preparing tackifiers.

Other important objects of the present invention are to provide an improved energy efficient process for preparing tackifiers, adhesives and dispersions of low-molecular weight polymers and other solid materials in water.

As used in the following description and claims, the terms low-molecular weight polymer should be understood to generally include polymers, resins, low softening point polymers and resins.

SUMMARY OF THE INVENTION

In brief, an improved process for preparing tackifiers and adhesives is provided. The method of the invention is an improved energy efficient process for preparing tackifiers, adhesives and dispersions of low-molecular weight polymers and other materials in water. Fine grinding of a low molecular weight polymer is performed to provide the low molecular weight polymer reduced to a selected average particle size in a range between approximately 2.5 µm and approximately 7.5 µm with a maximum particle size of less than 10 µm.

In accordance with features of the invention, this reduced average particle size is provided to allow for uniform distribution of the adhesive on the substrate. Centrifugal or jet mills are used to reduce the particle size of the low molecular weight polymer, eliminating the use of sub-critical or super-critical fluids.

In accordance with features of the invention, the low molecular weight polymer having the reduced particle size is mixed in water to directly form a desired dispersion, without first forming an emulsion.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
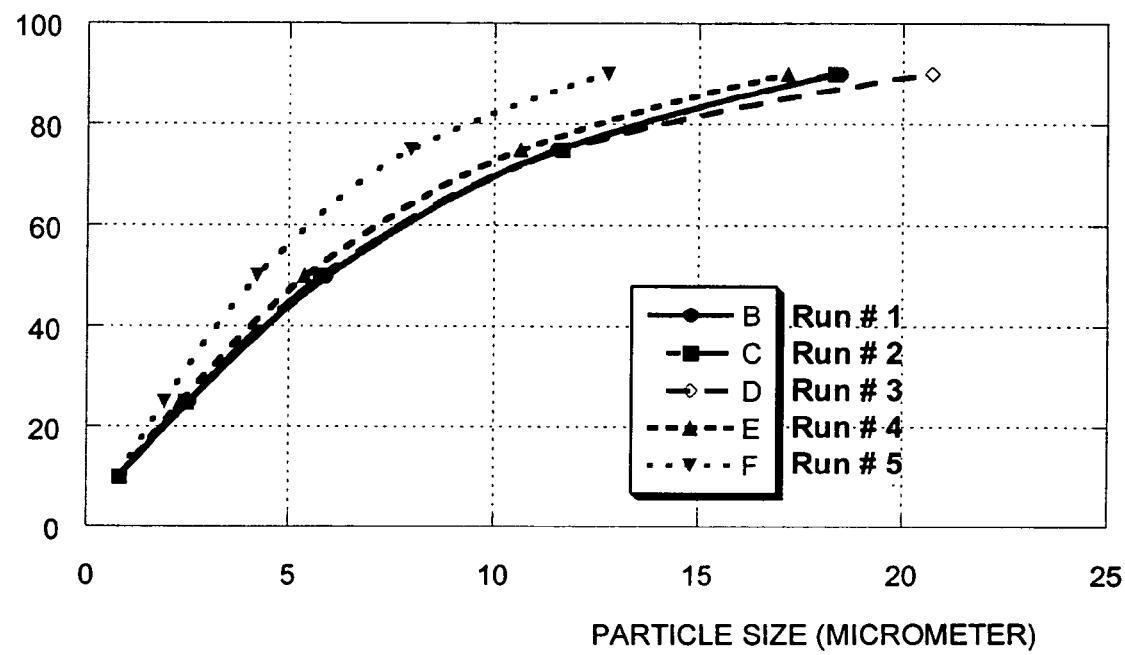
FIG. 1 is a chart illustrating test results of the method of the invention with volume percentage (%) under indicated particle size with respect to the vertical axis and particle size in micrometer with respect to the horizontal axis.

In accordance with features of the invention, a new method is provided enabling the reduction of the time and energy required to produce the tackifiers. First, the inventors have found that they are able to reduce the average particle size of the low molecular weight polymer to 2.5 µm and the maximum particle size to less than 10 µm using centrifugal or jet mills, eliminating the need for the use of sub-critical or super-critical fluids to produce the very fine powder necessary for the process. Testing of the produced powder shows that mixing the powder in water for only a few minutes in the presence of the proper disbursing agents and surfactants, is sufficient to form a desired dispersion, without first forming an emulsion as was previously necessary. Thus by the new method the inventors are able to save substantial thermal energy and reduce processing time from hours to minutes over the known methods.

In accordance with features of the invention, the novel method includes directly forming a dispersion instead of an emulsion. Directly forming a dispersion is achieved by size reduction of the polymer particles. The size reduction is provided via a dry process, using centrifugal mills or jet mills, instead of in an aqueous solution, as the other conventional methods require. Using refrigerants, such as dry ice, liquid carbon dioxide or liquid nitrogen, enable size reduction of polymers with low softening points in a dry process by making them brittle and easier to break down. The temperature to which the polymers have to be cooled depends on their brittleness temperature. Size reduced higher softening point polymers, such as greater than about 60° C., can then be used to form dispersions, when presently such polymers can be processed by using organic solvents only.

Additional benefits of the new process are that the method of the invention can process resins that presently cannot be processed without using solvents. The method of the invention allows making tackifiers using minimal amount of water and eliminates the shipping of excess water, which requires subsequent evaporation.

It should be understood that the method of the invention could allow making adhesives in a single step, generally eliminating the need for the tackifier step. The method of the invention could open new markets for tackifier makers because dry pulverized resins can be shipped, instead of water emulsions. The method of the invention can be applied to produce products made with mixed resins that have different softening temperatures.

We selected Jet Mills over centrifugal mills, even though both worked, because Jet Mills have no moving parts and did not require screens that can plug. We selected Jet Mills over high pressure shattering because Jet mills are less energy intensive, operating conditions are more favorable from a safety standpoint and Jet Mills produced more uniform particle sizes.

Experimental test results are summarized as follows.

Grinding Tests using a Fluid-Energy Co. "Jet-O-Mizer" Jet Mill were performed. A total of 5 tests, using about 2 pounds of material in each test, were conducted on this equipment all using Permalyn resin which has a softening point of about 100° C. and therefore can not be processed by the conventional water-based processes. The first 2 tests were conducted using the chips as is and without providing any cooling. Tests 3, 4 and 5 were conducted after the chips were size reduced to a fraction of a millimeter prior to jet milling. In test number 5 the crushed chips were also cooled using liquid nitrogen prior to jet milling. Other test conditions and the results are summarized in Table 1 and FIG. 1.

TABLE 1

Description of tests conducted on Permalyn in the Jet-O-Mizer Jet Mill.

| Test # | Rate Lb/hr | Pre-processing* | Cooling | Average Particle size |
|---|---|---|---|---|
| 1 | 20 | No | No | 8.01 |
| 2 | 40 | No | No | 7.77 |
| 3 | 20 | Yes | No | 11.10 |

TABLE 1-continued

Description of tests conducted on Permalyn in the Jet-O-Mizer Jet Mill.

| Test # | Rate Lb/hr | Pre-processing* | Cooling | Average Particle size |
|---|---|---|---|---|
| 4 | 40 | Yes | No | 7.36 |
| 5 | 20 | Yes | Liquid $N_2$ | 5.62 |

*Pre-processing involved reducing the particle size to a fraction of a millimeter prior to grinding in the Jet-Mill.

FIG. 1 illustrates results of tests conducted in the Jet-O-Mizer Jet Mill at Fluid Energy Co. The results show that:

(1) This equipment is capable of reducing the particle size of the tackifier polymers to about 7.5 μm.

(2) Cooling the chips using liquid $N_2$ resulted in 25% additional reduction in the average particle size.

(3) Pre-processing of the feed to reduce its size prior to jet milling is not necessary.

(4) Tests conducted under similar results demonstrated the reproducibility of the results.

(5) Changing the feed rate by 50% did not change the resulting average particle size.

Grinding Tests using a Fluid-Energy Co. "Micro-Jet" Jet Mill have been performed. Two tests were conducted using this piece of equipment. The first test was run using about 2 pounds of Permalyn without providing any cooling. The resulting average particle size was 3.66 μm. Therefore this equipment was used to conduct a 500 pound test, also without cooling. The average particle size that was achieved was 2.47 μm and the maximum particle size was under 10 μm. The particle size distribution for the two tests is presented in FIG. 2.

Figure 2:
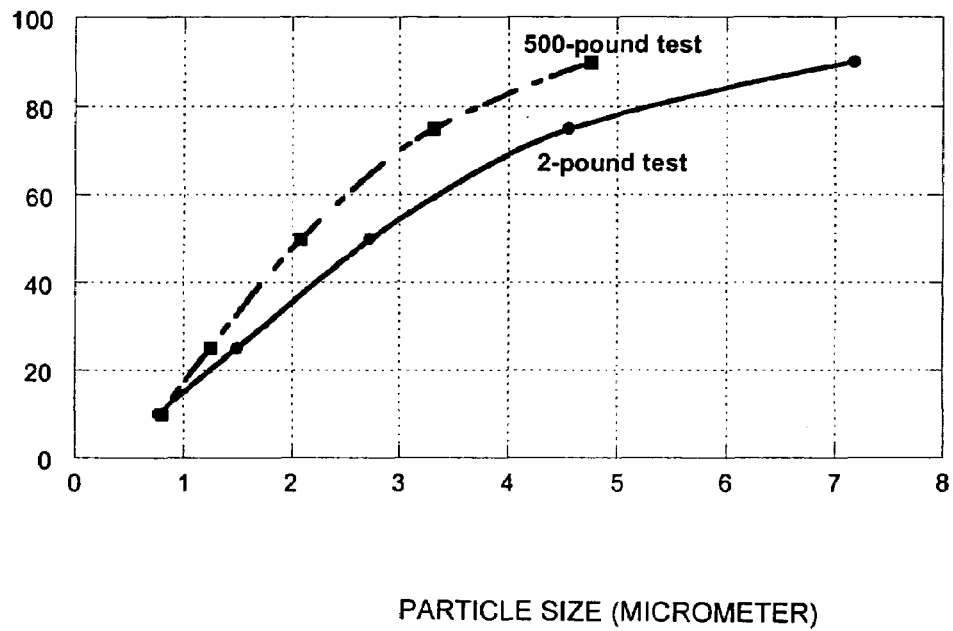
FIG. 2 is a chart illustrating additional test results of the method of the invention with volume percentage (%) under indicated particle size with respect to the vertical axis and particle size in micrometer with respect to the horizontal axis.

FIG. 2 illustrates results of tests conducted in the Micro-Jet Jet Mill at Fluid Energy Co. These results show that this equipment is capable of reducing the particle size of the Tackifier polymers to about 2.5 μm. Cooling the chips using liquid Nitrogen is expected to reduce the particle size further.

Full-scale equipment for pulverizing the tackifier polymers is found to be commercially available and proven. We conducted energy and economic analyses of the conventional process for making water-based Tackifier dispersions and for a system based on using the "Micro-Jet" mill for the present invention. Other similar commercial systems may be available from other vendors.

Jet-mills such as the Micro-Jet system use electric energy only. The energy requirements of the various Micro-Jet system components including a 1 hp screw feeder, a 1.5 hp rotary air lock, a timer on the dust collector and 400 hp (110 PSI pressure) compressor are substantially less than the conventional process. For example, the total energy consumption is about 2500 Btu/lb of resin processed. This represents a 78% energy savings compare to the conventional process.

Energy requirements of the various Micro-Jet system components show that the new process uses as much as 78% less energy than the conventional process. For comparison of energy consumption per lb of resin processed in the conventional process, one pound of resin processed is equivalent to about 2 lbs of Tackifier dispersion sold. The estimated energy cost of the new process per pound of resin processed is about $0.0375, assuming the total cost of electricity to be $0.15/kWhr. At a cost of electricity of $0.05/kWhr the cost will drop to $0.0125/pound of resin processed as compared to $0.0625/pound of resin processed by the conventional method at $0.15/kWhr and $5 per million Btu of thermal energy.

We also conducted an overall economic assessment of the process. In summary, the estimated overall cost of production of the powdered resins is substantially less than conventional methods for preparing tackifiers and adhesives.

While the present invention has been described with reference to the details of the embodiments of the invention shown in the drawing, these details are not intended to limit the scope of the invention as claimed in the appended claims.

What is claimed is:

1. A method for preparing tackifiers and adhesives comprising the steps of:
   providing a low-molecular weight polymer;
   cooling said low molecular weight polymer;
   grinding said low molecular weight polymer to provide a reduced average particle size, said reduced average particle size provided in a range between approximately 2.5 µm and approximately 7.5 µm with a maximum particle size of less than 10 µm; and
   directly forming a dispersion by mixing said low molecular weight polymer of reduced average particle size with water.

2. A method for preparing tackifiers and adhesives as recited in claim 1 wherein the step of providing said low-molecular weight polymer includes providing low molecular weight polymer chips.

3. A method for preparing tackifiers and adhesives comprising the steps of:
   providing chips of low-molecular weight polymer;
   cooling said chips of said low-molecular weight polymer using liquid $N_2$ for enhanced reduction in said average particle size;
   grinding said low molecular weight polymer chips to provide a reduced average particle size, said reduced average particle size provided in a range between approximately 2.5 µm and approximately 7.5 µm with a maximum particle size of less than 10 µm.

4. A method for preparing tackifiers and adhesives as recited in claim 3 wherein the step of grinding said low molecular weight polymer includes using jet mills for grinding said low molecular weight polymer.

5. A method for preparing tackifiers and adhesives as recited in claim 3 wherein the step of grinding said low molecular weight polymer includes using centrifugal mills for grinding said low molecular weight polymer.

6. A method for preparing tackifiers and adhesives as recited in claim 3 wherein said reduced average particle size of said low-molecular weight polymer has a volumetric diameter of less than 10 µm.

* * * * *